United States Patent [19]
Yamamoto

[11] Patent Number: 6,092,417
[45] Date of Patent: Jul. 25, 2000

[54] GYROSENSOR

[75] Inventor: Hiroshi Yamamoto, Yokohama, Japan

[73] Assignee: Canon Kabushiki Kaisha, Japan

[21] Appl. No.: 08/997,527

[22] Filed: Dec. 23, 1997

[30] Foreign Application Priority Data

Dec. 27, 1996 [JP] Japan .................................. 8-350177

[51] Int. Cl.⁷ .................................................. G01P 9/04
[52] U.S. Cl. ...................................... 73/504.04; 73/504.15
[58] Field of Search ........................... 73/504.02, 504.03,
73/504.04, 504.12, 504.13, 504.14, 504.15,
510, 511, 514.32, 514.33, 514.34, 514.29;
310/328, 329, 331, 332, 333

[56] References Cited

U.S. PATENT DOCUMENTS

| | | | |
|---|---|---|---|
| 5,012,174 | 4/1991 | Adkins et al. | 73/504.12 |
| 5,226,321 | 7/1993 | Varnham et al. | 73/504.13 |
| 5,329,815 | 7/1994 | Dunn et al. | 73/504.12 |
| 5,691,471 | 11/1997 | Okazaki et al. | 73/504.04 |
| 5,796,000 | 8/1998 | Fujiu et al. | 73/504.15 |

FOREIGN PATENT DOCUMENTS

| | | |
|---|---|---|
| 3-054414 | 3/1991 | Japan . |
| 3-172713 | 7/1991 | Japan . |
| 7-092175 | 4/1995 | Japan . |

*Primary Examiner*—Helen C. Kwok
*Attorney, Agent, or Firm*—Fitzpatrick, Cella, Harper & Scinto

[57] ABSTRACT

A gyrosensor has a weight. A plurality of deformable support portions support the peripheral portion of the weight. A driving device sequentially deforms the respective support portions to move the weight along a predetermined circular path. A detector detects an angular velocity acting upon the weight in accordance with a deviation of an actual circular path of the weight from the predetermined circular path.

12 Claims, 8 Drawing Sheets

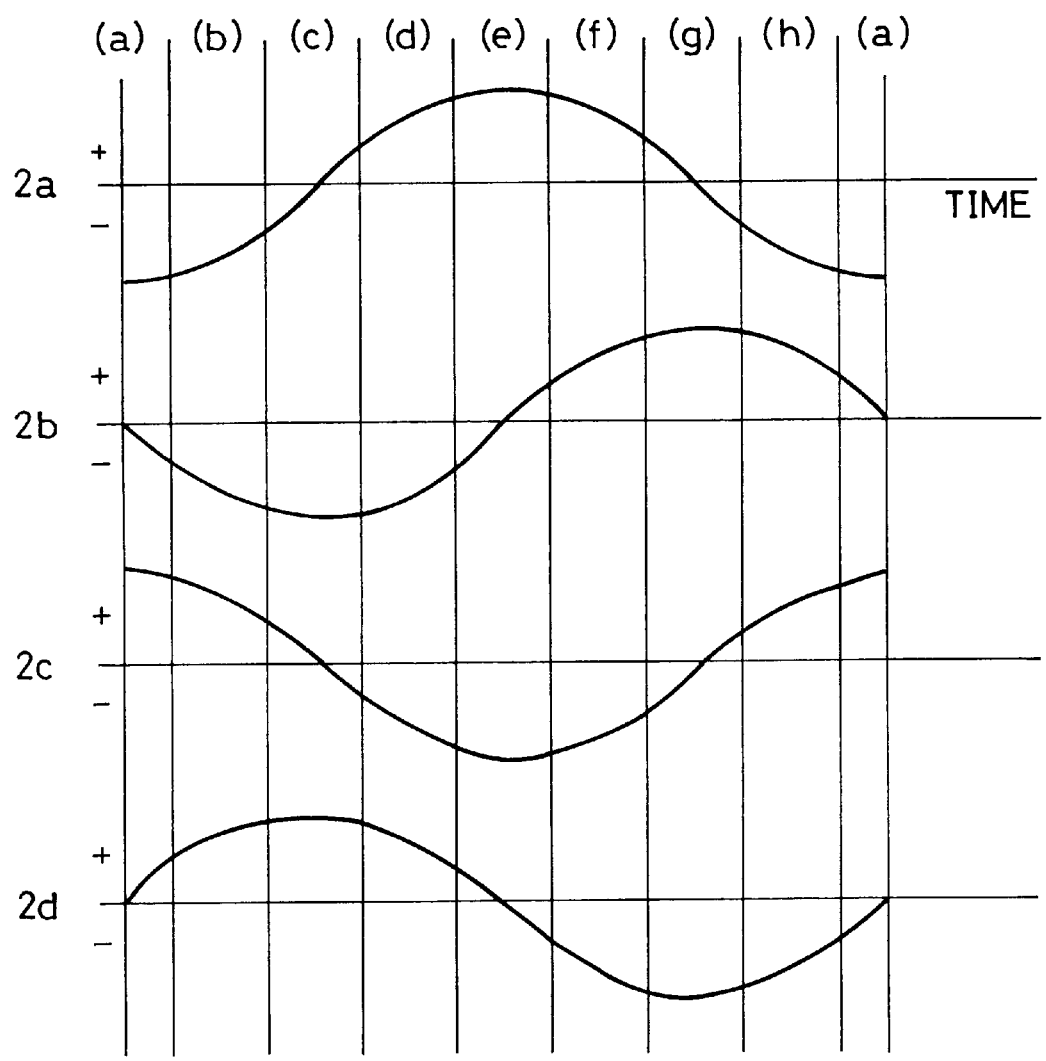

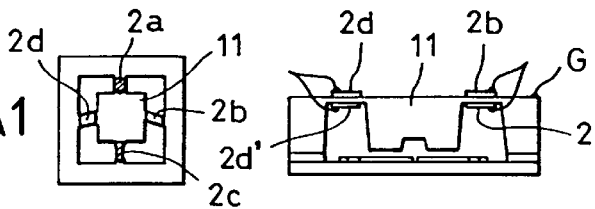
FIG. 6A1 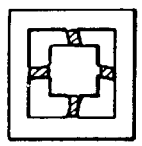 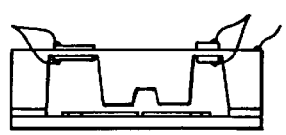 FIG. 6A2
FIG. 6B1 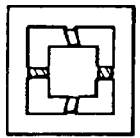 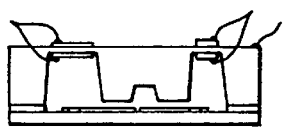 FIG. 6B2
FIG. 6C1 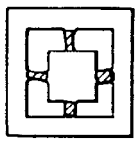 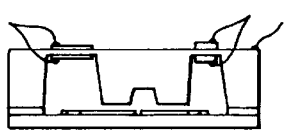 FIG. 6C2
FIG. 6D1 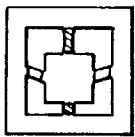 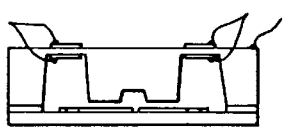 FIG. 6D2
FIG. 6E1 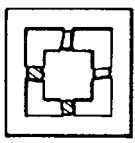 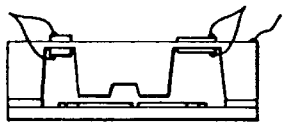 FIG. 6E2
FIG. 6F1 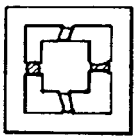 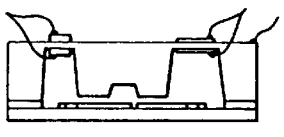 FIG. 6F2
FIG. 6G1 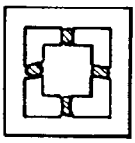 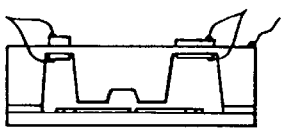 FIG. 6G2
FIG. 6H1 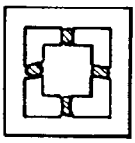 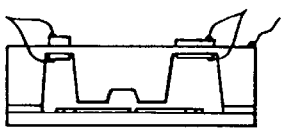 FIG. 6H2

GYROSENSOR

BACKGROUND OF THE INVENTION

1. Field of the Invention

The present invention relates to gyrosensors used in automobile navigation systems or used for performing position-controlling or correcting hand-shaking occurring in image pick-up apparatuses.

2. Related Background Art

Gyrosensors are finding widespread use in automobile navigation systems or shake isolating devices used in image pick-up apparatuses. Among such gyrosensors, vibrating gyrosensors, which are inexpensive and yet obtain high-precision angular velocities, are well known.

More specifically, the following gyrosensors disclosed in Japanese Patent Laid-Open Nos. 3-54414, 3-172713, and 7-092175 have been proposed. In such gyrosensors, if a vibrator is activated and an angular velocity is applied to the vibrator, a Coriolis force is generated. Due to this Coriolis force, the vibrator changes its state of vibration, and such changes are detected, thereby determining the amount and the direction of the angular velocity.

In the above gyrosensors, in order to improve the detecting performance, however, it is required that the amplitude and the frequency of vibrations be increased and the mass of the vibrator be also raised. Further, precise machining may be required for obtaining a correct difference between the two outputs from the gyrosensor, or subtle-adjustments may be needed after assembly.

Because of the above drawbacks, the miniaturization of the gyrosensors is restricted, and a reduction in the cost of the gyrosensors is also limited.

SUMMARY OF THE INVENTION

Accordingly, it is an object of the present invention to provide an inexpensive and ultraminiature gyrosensor.

In order to achieve the above object, there is provided a gyrosensor comprising: a weight; a plurality of deformable support portions for supporting the peripheral portion of the weight; a driving device for sequentially deforming the plurality of support portions so as to move the weight along a predetermined circular path; and a detector for detecting an angular velocity applied to the weight in accordance with a deviation of an actual circular path of the weight from the predetermined circular path.

Further objects, features and advantages of the present invention will become apparent from the following description of the preferred embodiments with reference to the attached drawings.

BRIEF DESCRIPTION OF THE DRAWINGS

FIG. 5 is a diagram illustrating the timing of supplying a current to drive transducer devices used in the gyrosensor shown in FIG. 1;

FIG. 6, which is comprised of FIGS. 6A1–6H1 and 6A2–6H2, is a plan view and a sectional view illustrating the operation of a weight used in the gyrosensor shown in FIG. 1;

DESCRIPTION OF THE PREFERRED EMBODIMENTS

The preferred embodiments of the present invention will now be explained with reference to the drawings.

Figure 10:
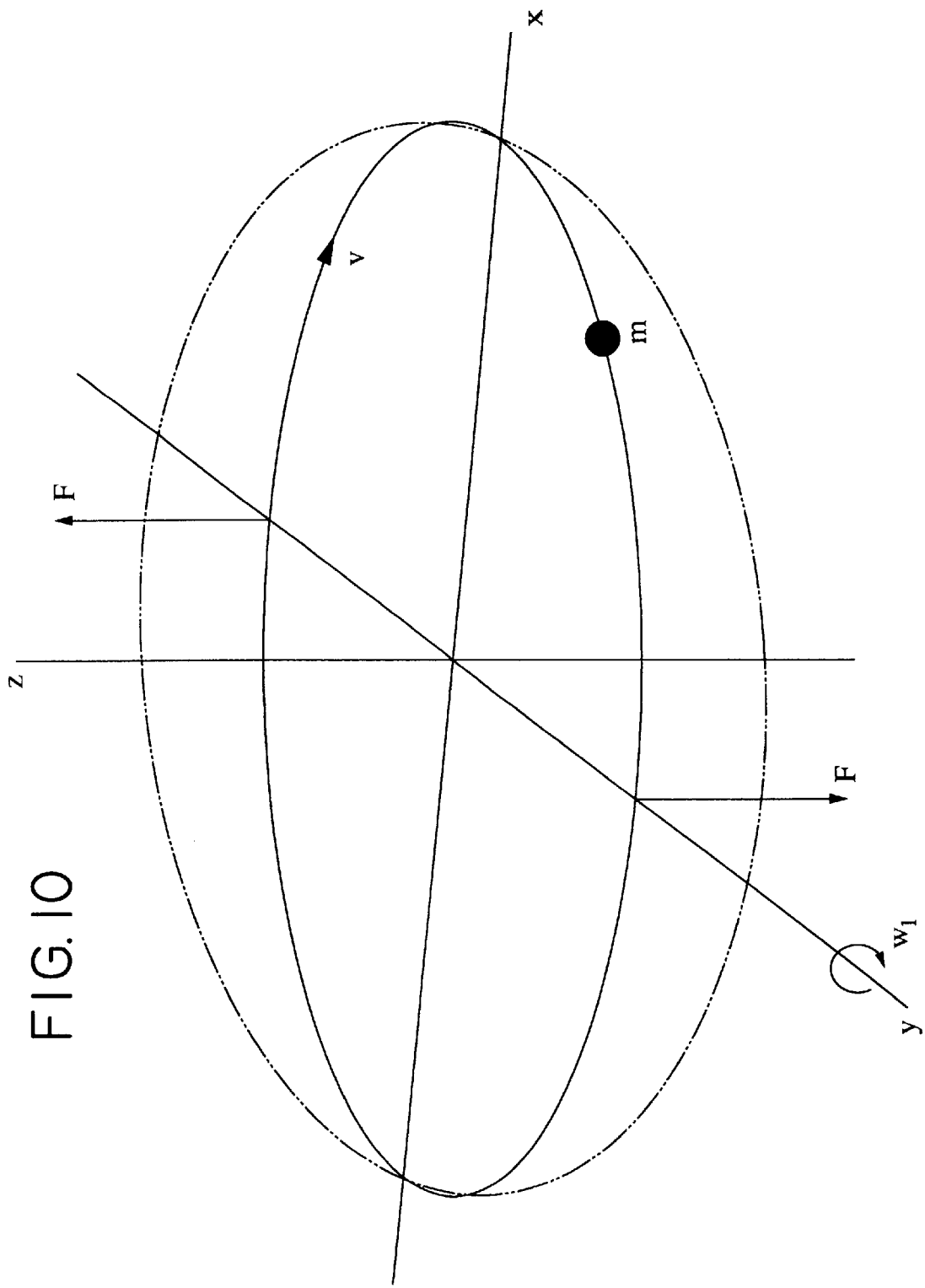
FIG. 10 illustrates the principle of the gyrosensors shown in FIGS. 1 and 9.

The principle of gyrosensors according to the following preferred embodiments of the present invention will first be described with reference to FIG. 10. A weight m circles clockwise in the plane including the x and y axes, which are perpendicular to each other, at a velocity v around the z axis, which is perpendicular to the x and y axes. At this time, when an angular velocity $\omega_1$ is applied to the weight m around the y axis, a force F is generated in the direction perpendicular to the y axis and parallel to the z axis. This force F is referred to as "a Coriolis force". In the above operation, the relationship $F=kmv\omega_1$ holds true, where k indicates a constant. In the following embodiments of the present invention, circling gyrosensors utilizing the above Coriolis force will be described.

The embodiments will now be explained in greater detail with reference to the drawings.

Figure 1:
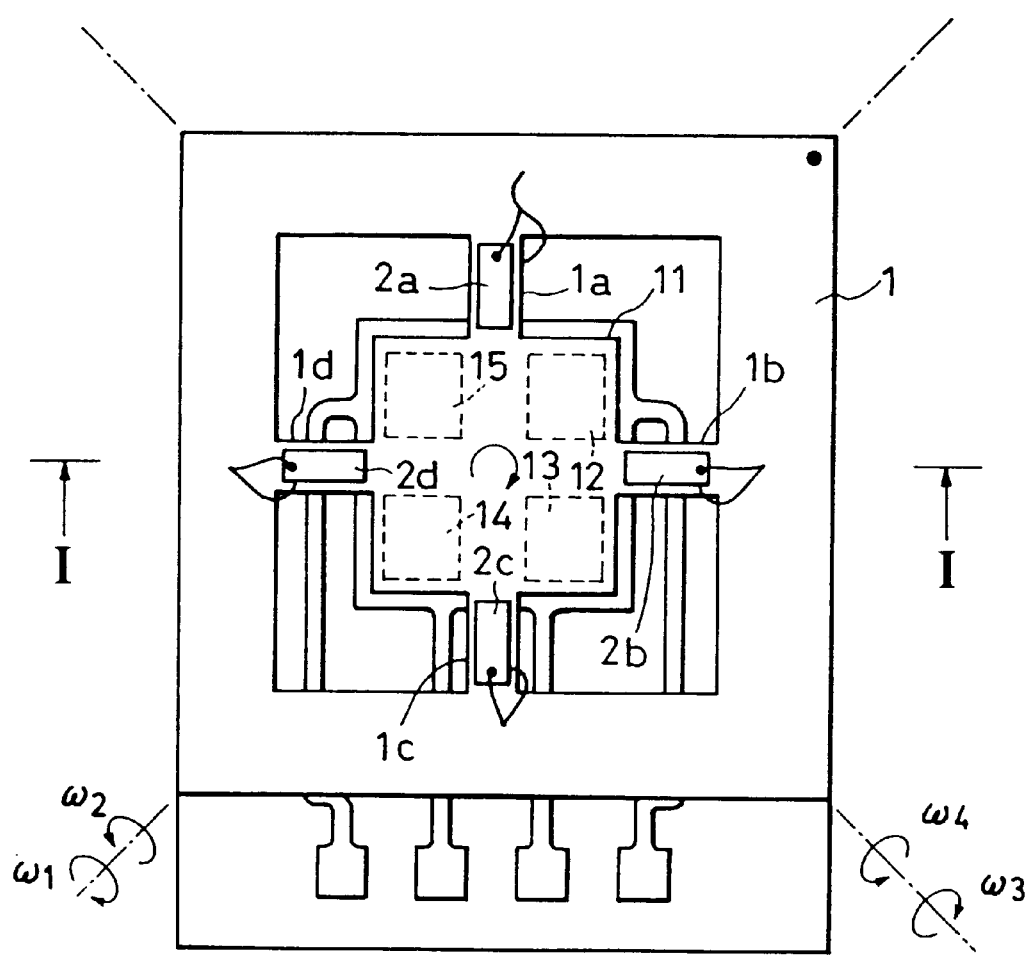
FIG. 1 is a plan view illustrating a gyrosensor according to an embodiment of the present invention.
Figure 2:
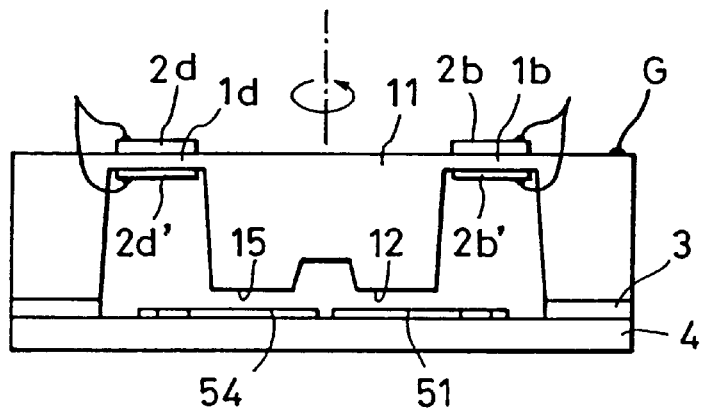
FIG. 2 is a cross-sectional view taken along line I—I of FIG. 1.

FIG. 1 is a plan view of a gyrosensor according to an embodiment of the present invention. FIG. 2 is a cross-sectional view taken along line I—I of FIG. 1. The main unit 1 of a gyrosensor includes elastic bridges 1a, 1b, 1c and 1d and a weight 11, all of which are integrally formed of a conductor. Fixed on the upper and lower surfaces of the bridges 1a, 1b, 1c and 1d are electrostrictive, piezoelectric, thermal-expansion, or electromagnetic transducer devices 2a, 2b, 2c and 2d and 2a', 2b', 2c' and 2d', respectively. The transducer devices 2a, 2b, 2c and 2d and 2a', 2b', 2c' and 2d' are mechanically expandable and contractable by supplying a current thereto. Electrodes 12, 13, 14 and 15 are formed on the lower surface of the weight 11. An electrode substrate 4 is formed on the lower surface of the main unit 1 of the gyrosensor by being fixed on the main unit 1 with an insulating material 3 therebetween.

Figure 3:
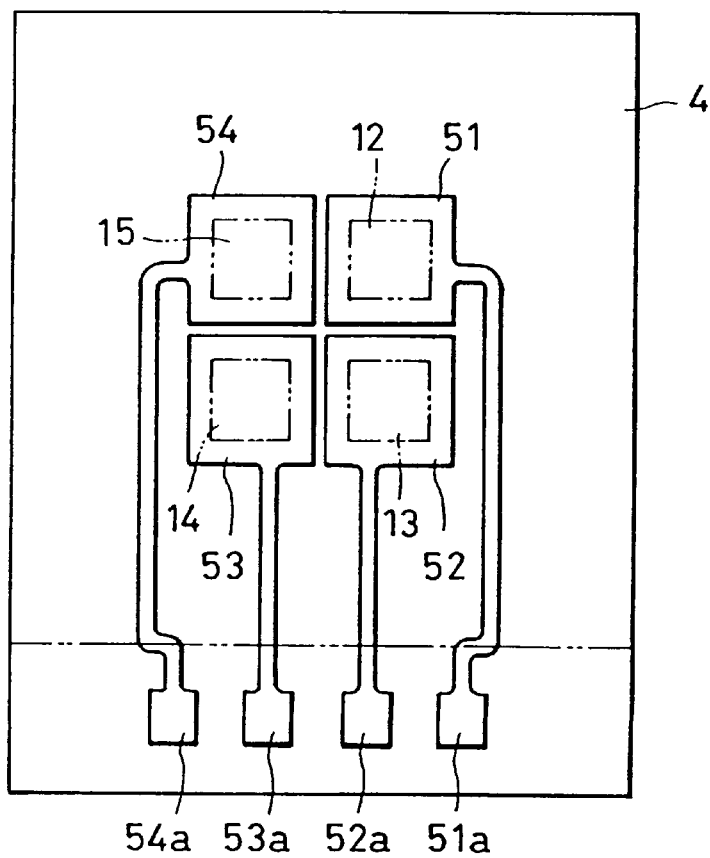
FIG. 3 is a plan view illustrating the pattern of an electrode substrate used in the gyrosensor shown in FIG. 1.

FIG. 3 is a plan view illustrating the configuration of the electrodes 12, 13, 14 and 15 formed on the electrode substrate 4. Also formed on the electrode substrate 4 are electrode patterns 51, 52, 53 and 54 which are provided with leading portions 51a, 52a, 53a and 54a, respectively. Square frames indicated by the two-dot-chain lines in FIG. 3 represent the planar positional relationship of the electrodes 12, 13, 14 and 15 formed on the lower surface of the weight 11.

Figure 4:
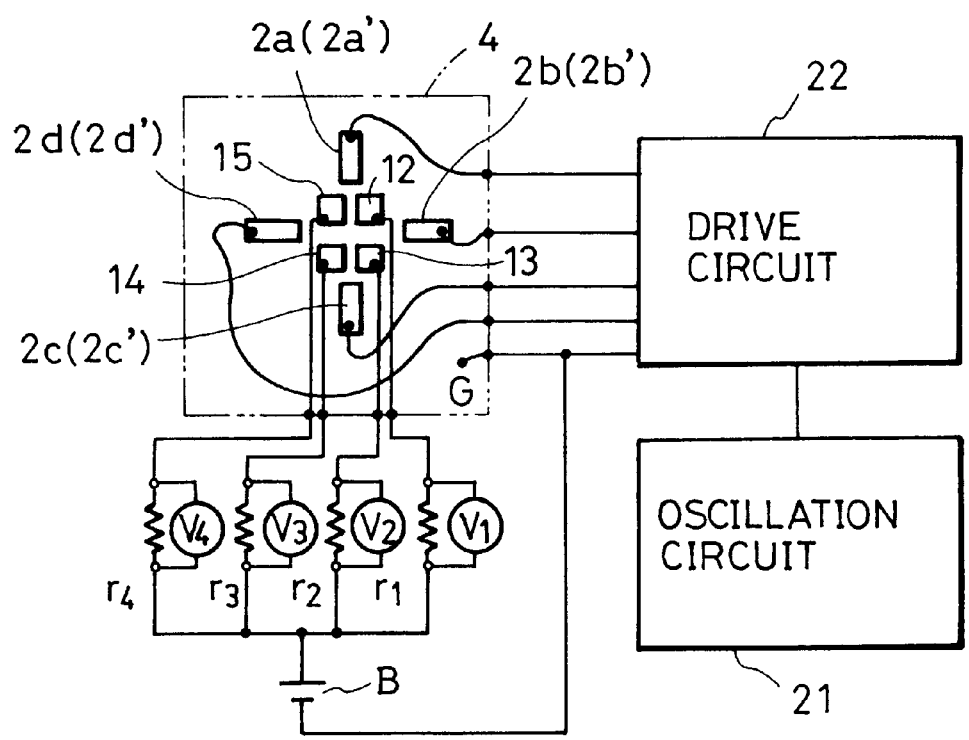
FIG. 4 is a circuit diagram illustrating the overall configuration of the gyrosensor shown in FIG. 1.

Referring to the circuit diagram of FIG. 4 illustrating the gyrosensor shown in FIG. 1, an oscillation circuit 21 generates a particular frequency to actuate a drive circuit 22. The drive circuit 22 sequentially supplies a current to the transducer devices 2a, 2b, 2c and 2d. The operation of this circuit will be explained when piezoelectric devices are used as the transducer devices 2a, 2b, 2c and 2d by way of example. The drive circuit 22 is adapted to transmit sine-wave voltage signals to the transducer devices 2a, 2b, 2c and 2d. The timing of transmitting the signals is shown in FIG. 5.

FIG. 5 shows that the sine-wave signals to the transducer devices 2a and 2c are 180° out of phase with each other, and the sine-wave signals to the transducer devices 2b and 2d are also 180° out of phase with each other. Further, the wave signals to the transducer devices 2a and 2b, 2b and 2c, 2c and 2d, and 2d and 2a are 90° out of phase with each other. Since a common electrode G is attached on one surface of the weight 11 on which either of the transducer devices 2a, 2b, 2c and 2d or 2a', 2b', 2c' and 2d' are formed, a positive or negative voltage is applied to the other surface of the weight 11 with the timing shown in FIG. 5.

FIG. 6A1 and 6A2 through 6H1 and 6H2 illustrates the states of the planar circling operation of the weight 11 in chronological order. The drawings on the left side of FIG. 6 (i.e., FIGS. 6A1–6H1) are plan views corresponding to FIG. 1, while the drawings on the right side of FIG. 6 (i.e., FIGS. 6A2–6H2) are cross-sectional views corresponding to FIG. 2. FIGS. 6A1 and 6A2 through 6H1 and 6H2 are associated with the voltage-applying timing indicated by (a) through (h), respectively, in FIG. 5. For example, in the state shown in FIGS. 6A1 and 6A2, a negative voltage is applied to the transducer devices 2a and 2a', which then contract. At the same time, a positive voltage is applied to the transducer devices 2c and 2c', which then expand. The transducer devices 2a and 2c and the transducer devices 2a' and 2c' are respectively formed on the upper surface and the lower surface of the weight 11 with respect to the common electrode G, and a current is simultaneously supplied to the transducer devices. Accordingly, the transducer devices 2a and 2a' contract in the same directions, and the transducer devices 2c and 2c' expand in the same directions. At this time, a signal having a resonant frequency of the section including the bridge 1a and the transducer devices 2a and 2a' is supplied. Thereafter, the sine-wave voltage signals illustrated in FIG. 5 are similarly applied to the transducer devices 2a, 2b, 2c and 2d, and 2a', 2b', 2c' and 2d', thereby causing the weight 11 to follow a predetermined circular path, as indicated by the states shown in FIGS. 6A1 and 6A2 through 6H1 and 6H2.

During the above operation, the transducer devices 2a, 2b, 2c and 2d may be used for driving the weight 11, while the transducer devices 2a', 2b', 2c' and 2d' may serve as sensors, such as electrostrictive transducer devices.

In FIG. 1, when an angular velocity $\omega_1$ is applied around an oblique axis to the gyrosensor configured as described above, a Coriolis force is generated and acts upon the weight 11, as has been discussed with reference to FIG. 10. Thus, a force in the upward and downward direction is further applied to the weight 11 which is circling in the plane as shown in FIG. 6. This state is shown in FIGS. 7 and 8.

Figure 7:
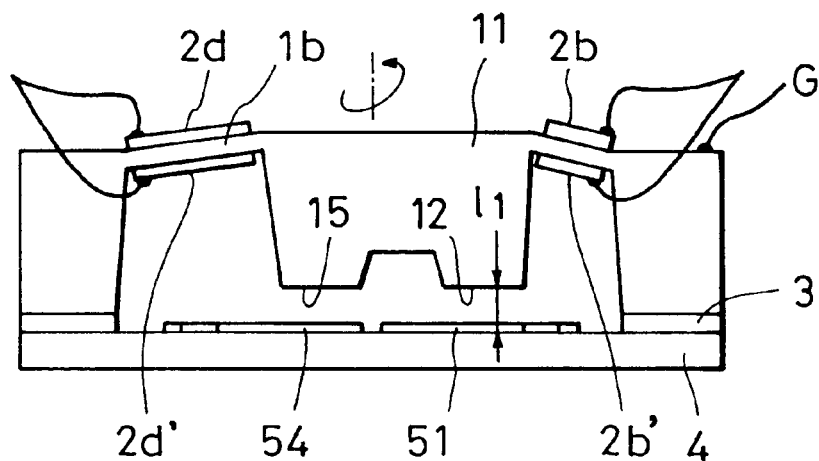
FIG. 7 is a sectional view illustrating the gyrosensor shown in FIG. 1 when a Coriolis force is applied to the weight circling in the plane.
Figure 8:
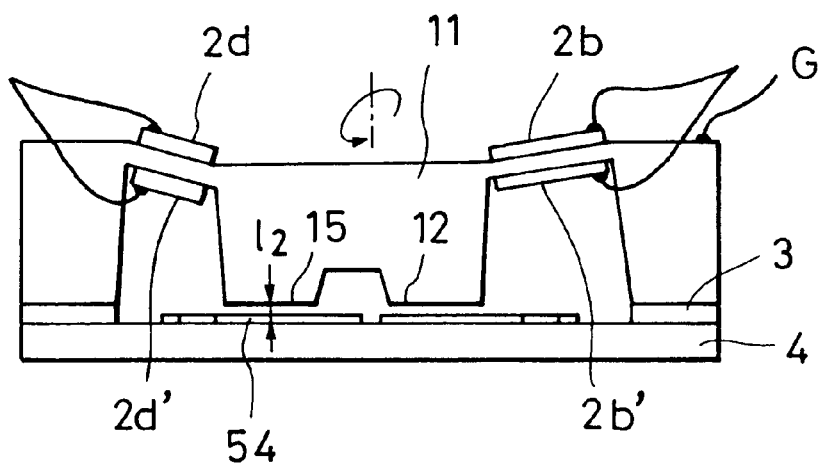
FIG. 8 is a sectional view illustrating the gyrosensor shown in FIG. 1 when a Coriolis force is applied to the weight circling in the plane.

In FIG. 7, the weight 11 continues to circle in the plane, as indicated by the states of FIGS. 6A1 and 6A2 through 6H1 and 6H2, while following a path in such a manner that the weight 11 is inclined rightward, as shown in FIG. 7, and declined leftward, as illustrated in FIG. 8. The position of the electrodes 12, 13, 14 and 15 is set so that the electrodes 12, 13, 14 and 15 can be contained within the substrate electrodes 51, 52, 53 and 54, respectively, while the weight 11 is circling. In terms of the gap between the electrodes 12, 13, 14 and 15 and the substrate electrodes 51, 52, 53 and 54, respectively, the gap between the electrode 12 and the substrate electrode 51 increases to an amount $l_1$, as shown in FIG. 7, while the gap between the electrode 15 and the substrate electrode 54 decreases to an amount $l_2$, as illustrated in FIG. 8. As indicated by the circuit diagram of FIG. 4, the gap between each of the electrodes 12, 13, 14 and 15 and each of the substrate electrodes 51, 52, 53 and 54 serves as a capacitor. This gap is changed to $l_1$ or $l_2$, thereby varying the capacitance. Since a voltage B is applied, as shown in FIG. 4, between each electrode and each substrate electrode, the currents flowing in resistors $r_1$, $r_2$, $r_3$ and $r_4$ are changed. The voltages $V_1$, $V_2$, $V_3$ and $V_4$ across the respective resistors $r_1$, $r_2$, $r_3$ and $r_4$ can be measured to detect the amount and the direction of the movement of the weight 11. In other words, the voltages $V_1$, $V_2$, $V_3$ and $V_4$ can be measured to determine the amount and the direction of the angular velocity applied to the weight 11 which is circling in the plane. The circuit shown in FIG. 4 may be configured in such a manner that the difference between the voltages $V_1$ and $V_3$ ($V_1-V_3$) or between the voltages $V_2$ and $V_4$ ($V_2-V_4$) may be obtained. In this case, the output may be doubled, thereby making it possible to detect the angular velocities $\omega_1$ and $\omega_2$, or the angular velocities $\omega_3$ and $\omega_4$ shown in FIG. 1 with a higher output.

Further, the difference between ($V_1-V_3$) and ($V_2-V_4$) may be detected. In this case, the angular velocities applied in a direction perpendicular to the weight 11 can also be determined. In this manner, the angular velocities $\omega_1$ and $\omega_2$ in one axis and the angular velocities $\omega_3$ and $\omega_4$ in another axis can be simultaneously detected.

In the foregoing embodiment, piezoelectric devices are used as the transducer devices, which serve as driving sources for circling the weight 11. However, other types of transducer devices, such as magnetostrictive or electrothermal-expansion devices may be used. Moreover, although the electrodes forming the sensor portion detect the movement of the weight 11 by utilizing the principle of capacitance, a deformation-detecting device may be provided for each of the bridges 1a, 1b, 1c and 1d, or an optical sensor may be used.

Although in the foregoing embodiment, four bridges 1a, 1b, 1c and 1d are disposed, any number of bridges may be provided as long as there are three or more. Further, the electrodes forming the sensor portion are formed of four pairs of electrodes 12, 13, 14 and 15 and substrate electrodes 51, 52, 53 and 54, respectively. However, any number of pairs of electrodes may be provided as long as there are three or more.

As a manufacturing method for the foregoing gyrosensor, a semiconductor process may be utilized to micromachine the gyrosensor. In this case, a plurality of the foregoing gyrosensors may be arranged in parallel to each other to generate the respective sensor outputs, thereby making it possible to obtain an averaged output with less variations.

Figure 9:
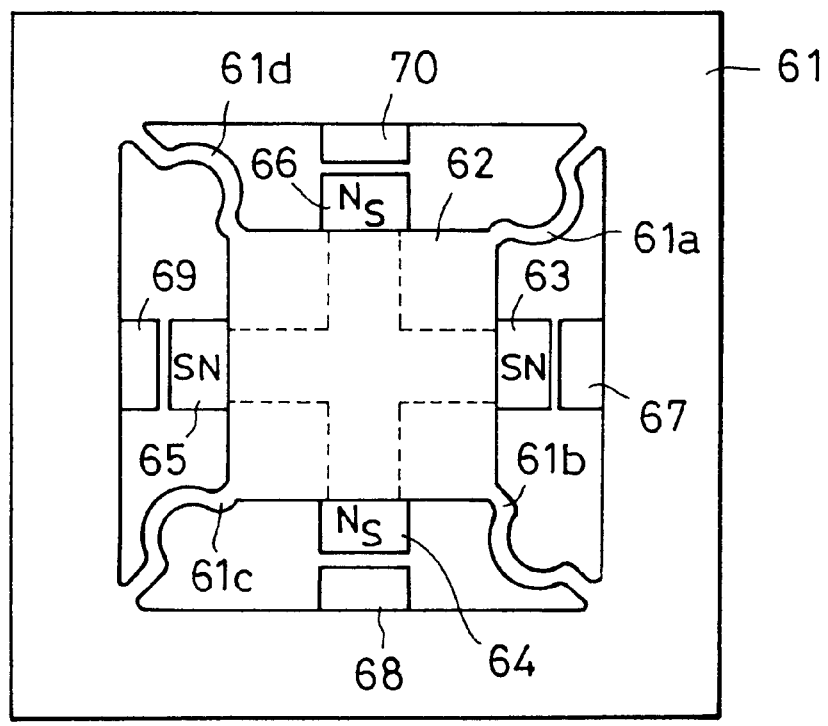
FIG. 9 is a plan view illustrating a gyrosensor according to another embodiment of the present invention.

FIG. 9 is a plan view illustrating a gyrosensor according to another embodiment of the present invention. Bridges 61a, 61b, 61c and 61d are provided to internally contact the main unit 61 of the gyrosensor. Permanent magnets 63, 64, 65 and 66 are fixed to a weight 62 held by the bridges 61a, 61b, 61c and 61d, and electromagnets 67, 68, 69 and 70 are further fixed to opposedly face the permanent magnets 63, 64, 65 and 66, respectively.

The driving method for this gyrosensor is similar to the method using the piezoelectric devices employed in the previous embodiment. In this method, a current is sequentially supplied to the electromagnets 67, 68, 69 and 70 so as to move the weight 62 in a circular path in the plane. A technique of detecting changes in the weight 62 is also similar to that of the previous embodiment, and an explanation thereof will thus be omitted.

As is seen from the foregoing description, it is possible to provide an inexpensive and miniaturized gyrosensor.

The individual components shown in schematic or block form in the Drawings are all well-known in the camera arts and their specific construction and operation are not critical to the operation or best mode for carrying out the invention.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The present invention may be achieved by combining the foregoing embodiments or their technical elements as required.

Further, in the present invention, the claims or the configuration of the foregoing embodiments may partially or wholly form one gyrosensor, or may be connected to another gyrosensor, or may be used merely as elements forming a gyrosensor.

What is claimed is:

1. A gyrosensor comprising:
   (A) a weight;
   (B) a plurality of deformable support portions for supporting the peripheral portion of said weight;
   (C) a driving device for sequentially deforming said plurality of support portions so as to move said weight along a predetermined circular path, said driving device comprising an electromechanical transducer device fixed on each of an upper and a lower surface of each said plurality of deformable support portions; and
   (D) a detector for detecting an angular velocity applied to said weight in accordance with a deviation of an actual circular path of said weight from the predetermined circular path.

2. A gyrosensor according to claim 1, wherein said electromechanical transducer device comprises a piezoelectric device.

3. A gyrosensor according to claim 1, wherein said detector outputs a signal in accordance with an angular velocity acting around an axis which is positioned in a direction perpendicular to a center axis of the predetermined circular path.

4. A gyrosensor according to claim 1, wherein said detector outputs signals in accordance with angular velocities acting around axes which are positioned in directions different from each other and are perpendicular to a center axis of the predetermined circular path.

5. A gyrosensor according to claim 1, wherein said detector comprises a plurality of detecting portions which output signals in accordance with angular velocities acting around axes which are positioned in directions different from each other and are perpendicular to a center axis of the predetermined circular path.

6. A gyrosensor according to claim 1, wherein said detector comprises a detecting portion for detecting a deviation of an actual circular path of said weight from the predetermined circular path.

7. A gyrosensor according to claim 6, wherein said detector detects a deviation of an actual circular path of said weight from the predetermined circular path by utilizing a change in capacitance.

8. The gyrosensor according to claim 1, further comprising a main unit including a lower surface, wherein said detector comprises:
   a first plurality of electrodes formed on a lower surface of said weight; and
   a second plurality of electrodes formed on the lower surface the main unit, wherein said first and second plurality of electrodes are disposed so as to form a gap there between.

9. The gyrosensor according to claim 8, wherein said detector detects a deviation of an actual circular path of said weight from the predetermined circular path by monitoring a change in capacitance of the gap formed between said first and second plurality of electrodes.

10. The gyrosensor according to claim 8, further comprising:
    a voltage source connected between said first and second plurality of electrodes; and
    a resistor connected in series between each said first plurality of electrodes and said voltage source, wherein a voltage across each said resistor is measured to determine an amount and a direction of an angular velocity applied to said weight.

11. A gyrosensor according to claim 1, wherein said driving device comprises two electromechanical transducer devices fixed respectively on each of the upper and lower planar surface of each of said plurality of deformable support portions.

12. A gyrosensor according to claim 1, wherein an electromechanical transducer device is fixed on each of an upper face and a lower face of each of said plurality of deformable support portions.

* * * * *

UNITED STATES PATENT AND TRADEMARK OFFICE
CERTIFICATE OF CORRECTION

PATENT NO. : 6,092,417
DATED : July 25, 2000
INVENTOR(S) : Hiroshi Yamamoto

It is certified that error appears in the above-identified patent and that said Letters Patent is hereby corrected as shown below:

Column 1,
Line 28, "subtle-adjustments" should read -- subtle adjustments --.

Column 4,
Line 12, "($V_2$-$V_4$" should read -- ($V_2$-$V_4$) --.
Line 13, "(" should be deleted.

Column 6,
Line 22, "the" should read -- of the --.
Line 24, "there between" should read -- therebetween --.

Signed and Sealed this

Twenty-fourth Day of May, 2005

JON W. DUDAS
*Director of the United States Patent and Trademark Office*